US012767337B2

(12) United States Patent
Alstad

(10) Patent No.: US 12,767,337 B2
(45) Date of Patent: Oct. 20, 2026

(54) MULTI-PIECE ENGINE MOUNT SYSTEM AMENABLE TO ADDITIVE MANUFACTURE

(71) Applicant: HONEYWELL INTERNATIONAL INC., Charlotte, NC (US)

(72) Inventor: Shawn Alstad, Phoenix, AZ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 78 days.

(21) Appl. No.: 18/951,850

(22) Filed: Nov. 19, 2024

(65) Prior Publication Data

US 2026/0138748 A1 May 21, 2026

(51) Int. Cl.
*B64D 27/40* (2024.01)
*B64D 27/00* (2006.01)
*F16M 1/04* (2006.01)

(52) U.S. Cl.
CPC ............... *B64D 27/40* (2024.01); *F16M 1/04* (2013.01)

(58) Field of Classification Search
CPC ...... B64D 27/40; B64D 27/402; B64D 27/12; B64D 27/10; B64D 27/408; B64D 27/00; F16M 1/04; B64C 3/32
USPC ............................ 248/554, 557; 244/54, 131
See application file for complete search history.

(56) References Cited

U.S. PATENT DOCUMENTS 5,275,357 A * 1/1994 Seelen ................. B64D 27/404 60/797
5,620,154 A * 4/1997 Hey .......................... F02C 7/20 60/797
6,189,830 B1 * 2/2001 Schnelz ............... B64D 27/406 244/54
6,296,203 B1 * 10/2001 Manteiga ............ F16C 11/0614 60/797
6,494,403 B2 * 12/2002 Jule ...................... B64D 27/406 244/54
6,758,438 B2 * 7/2004 Brefort ................ B64D 27/406 244/54
6,843,449 B1 * 1/2005 Manteiga ............. B64D 27/404 244/54
6,988,692 B2 * 1/2006 Pasquer ............... B64D 27/404 244/54
7,021,585 B2 * 4/2006 Loewenstein ........ B64D 27/404 60/797
7,165,743 B2 * 1/2007 Pasquer ............... B64D 27/404 60/797
7,909,285 B2 * 3/2011 Dron .................... B64D 27/404 244/54
7,909,302 B2 * 3/2011 Audart-Noel ............. F02C 7/20 244/54

(Continued)

*Primary Examiner* — Nkeisha Smith
(74) *Attorney, Agent, or Firm* — Ingrassia, Fisher & Lorenz LLP

(57) ABSTRACT

A mount system for coupling an engine with a frame includes a yoke that has two limbs that couple with the engine and that has a hub from which the two limbs extend. The yoke also couples with the frame. The yoke includes separate pieces that may be formed separate from one another and that join together around the hub, with plate sections of the pieces having overlapping parts that define mating surfaces between the pieces. Apertures are defined through the plate sections and the hub to receive pins for securing the pieces together. A plural number of shear planes are defined by the overlapping parts at each of the apertures and pins.

20 Claims, 8 Drawing Sheets

(56) References Cited

U.S. PATENT DOCUMENTS

| | | | | |
|---|---|---|---|---|
| 8,152,094 | B2 * | 4/2012 | Foster | B64D 27/40 244/54 |
| 8,251,311 | B2 * | 8/2012 | Combes | B64D 27/406 244/54 |
| 9,193,467 | B2 | 11/2015 | Barnes et al. | |
| 9,217,337 | B2 * | 12/2015 | Sandy | F02C 7/20 |
| 10,155,594 | B2 | 12/2018 | Whiteford et al. | |
| 10,220,950 | B2 * | 3/2019 | Zheng | B64D 27/404 |
| 10,472,080 | B2 | 11/2019 | Zameroski | |
| 11,407,519 | B2 | 8/2022 | Lansiaux et al. | |
| 11,679,886 | B2 * | 6/2023 | Berjot | B64D 27/406 244/54 |
| 11,760,498 | B2 * | 9/2023 | Gormley | B64D 27/406 244/54 |
| 11,884,410 | B2 * | 1/2024 | Addagatla | F01D 25/28 |
| 11,975,857 | B2 * | 5/2024 | Berjot | F02C 7/20 |
| 11,987,370 | B2 * | 5/2024 | Geliot | F02C 7/20 |
| 12,337,978 | B2 * | 6/2025 | Pautis | B64D 27/40 |
| 12,448,137 | B2 * | 10/2025 | Deforet | F02C 7/20 |
| 2007/0138337 | A1 * | 6/2007 | Audart-Noel | F16C 27/02 244/53 R |
| 2010/0127117 | A1 * | 5/2010 | Combes | B64D 27/406 244/54 |
| 2014/0183298 | A1 * | 7/2014 | Brochard | F16F 1/50 244/54 |
| 2019/0152615 | A1 * | 5/2019 | Combes | B64D 27/402 |
| 2020/0307816 | A1 * | 10/2020 | Berjot | B64F 5/10 |
| 2020/0346771 | A1 * | 11/2020 | Deforet | B64D 27/406 |
| 2023/0249838 | A1 * | 8/2023 | Addagatla | F01D 25/28 244/54 |
| 2024/0417085 | A1 * | 12/2024 | Deforet | B64D 27/404 |
| 2026/0077872 | A1 * | 3/2026 | Berjot | B64D 27/402 |

* cited by examiner

MULTI-PIECE ENGINE MOUNT SYSTEM AMENABLE TO ADDITIVE MANUFACTURE

TECHNICAL FIELD

The present disclosure generally relates to coupling a propulsion system to supporting frame, and more particularly relates to a mount system having components made of multiple assembled pieces that are sized for manufacture by a printer for applications such as a gas turbine engine.

BACKGROUND

Mount systems are used in a variety of applications to physically support or connect objects relative to each other. One application where mount systems are employed involves turbomachines, such as those in turbofan, turbojet, and other gas turbine engines. These applications may involve components of considerable physical size that may be fabricated of materials such as metal including titanium alloys. Titanium alloys may include iron, aluminum, vanadium, molybdenum and/or other constituents. The alloy mix may be tailored to produce strong, lightweight products that have high strength to weight properties along with heat and corrosion resistance. Manufacturing such components tends to be complex and requires substantial capital investment.

In the case of larger sized components, the types of manufacturing processes that may be employed becomes limited. For example, the use of additive manufacturing/printing is generally not an option because printers tend to have limited size. Instead, processes such as forging or casting with additional extensive machining may be required. Additive manufacturing, when available as an option, provides design flexibility, lower lead times, and lower costs.

Using printing processes such as powder bed fusion, material jetting, material extrusion, vat photopolymerization and others may be desirable. For example, in powder bed fusion, alloy powder is deposited on a build plate and energy, such as in the form of a laser is selective applied to the powder bed for fusing the material into the desired part's shape. The size of the printer and its build surface, bed area and other parameters, limit the size of components that may be fabricated using the technique.

Accordingly, it is desirable to enable printing larger sized components within the size limitations of available printing machines, while providing the functionality, strength and other features of the assembled component. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a mount system is provided for coupling an engine with a frame and includes a yoke having two limbs that couple with the engine. The yoke has a hub from which the two limbs extend. The yoke also couples with the frame. The yoke includes separate pieces that join together around the hub, with plate sections of the pieces having overlapping parts that define mating surfaces between the pieces. Apertures are defined through the plate sections and through the hub to receive pins for securing the pieces together. A plural number of shear planes are defined by the overlapping parts at each of the apertures and pins.

In additional embodiments, a mount system for coupling an engine with a frame includes a yoke having a first limb and a second limb. The first limb and the second limb may couple with the engine. The yoke includes a hub from which the first and second limbs extend. The yoke may also couple with the frame. The yoke is fabricated as separate pieces that include the first limb, the second limb, and the hub, that are assembled together after forming. The first limb and the second limb join together around and with the hub. Plate sections of the first limb, the second limb, and the hub have overlapping parts that define mating surfaces between the first limb, the second limb, and the hub. Apertures are defined through the plate sections of each of the first limb, the second limb, and the hub. The apertures receive pins for securing the first limb, the second limb, and the hub together. A plural number of shear planes are defined by the overlapping parts at each of the apertures and the pins In other embodiments, a mount system for coupling an engine with an airframe includes a yoke having a first limb, a second limb and a hub from which the first and second limbs extend. The first limb, the second limb and the hub each couple with both the engine and with the airframe. The yoke is assembled from separate pieces that include the first limb, the second limb, and the hub. The first limb and the second limb join together around and with the hub, with plate sections of the first limb, the second limb, and the hub having overlapping parts that define mating surfaces between the first limb, the second limb, and the hub. The plate sections have pads extending from the mating surfaces. The pads define a contact slip fit between the first limb and the hub, and between the second limb and the hub. Apertures are defined through the plate sections of each of the first limb, the second limb, and the hub. The apertures receive pins for securing the first limb, the second limb, and the hub together. A plural number of shear planes are defined by the overlapping parts at each of the apertures and the pins.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
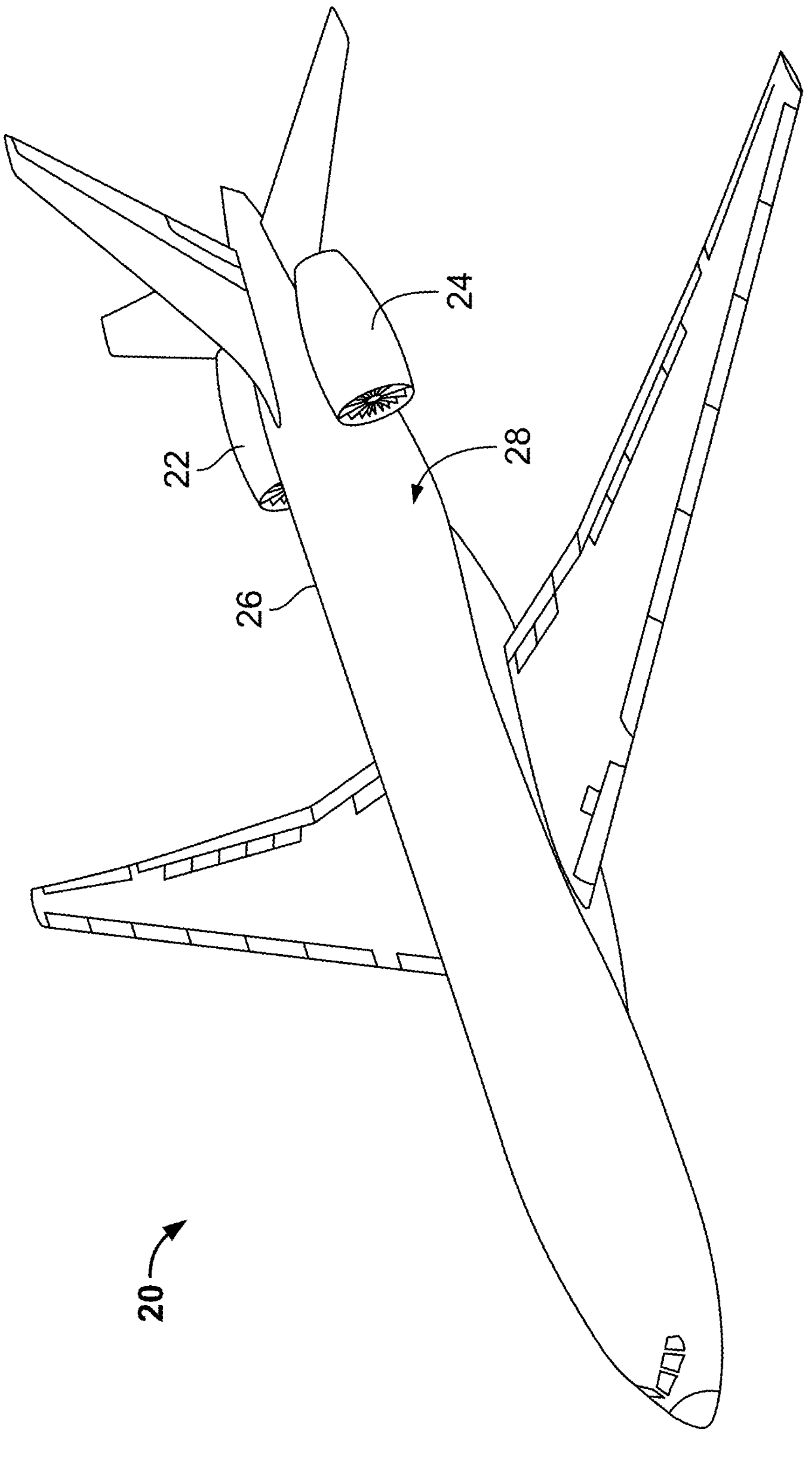
FIG. 1 is a is a perspective view of an aircraft with turbine engines, in accordance with a number of embodiments.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from a spring biased retention system and the use of the spring biased retention system for coupling a shroud to a case associated with a gas turbine engine described herein is merely one exemplary embodiment according to the present disclosure. In addition, while the spring biased retention system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, an aircraft 20 includes a pair of turbine engines 22 and 24, which are configured as turbofan engines. Although described in the context of the aircraft 20, various features and characteristics disclosed herein may be used in other contexts and applications where a mount system is used. For example, although the engines 22 and 24 are used with the aircraft 20, various other engine environments, as well as different types of mounted machinery or other various connected bodies will benefit from the features described herein. Thus, no particular feature or characteristic is constrained to an aircraft or turbofan engine, and the principles are equally embodied in other vehicles, such as automobiles, or in other equipment, such as power generators or compressors, and in other applications.

Figure 2:
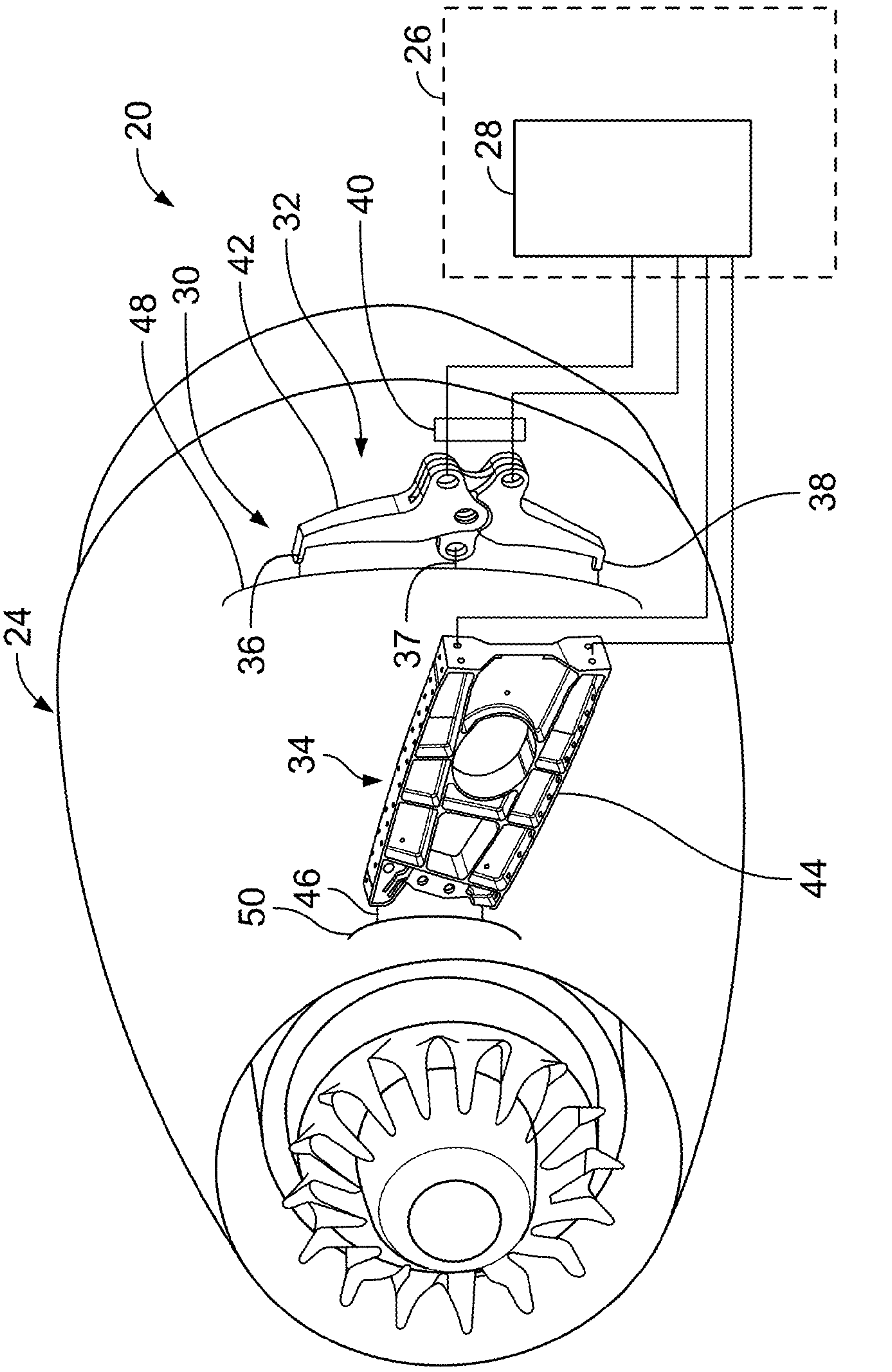
FIG. 2 is a schematic, perspective view of a part of a gas turbine engine of the aircraft of FIG. 1 showing aspects of a mount system, in accordance with a number of embodiments.

In the current embodiment, the aircraft 20 is powered by the engines 22 and 24, which may provide a motive force and/or in this or other applications, may provide pneumatic, electrical and/or hydraulic power generation. Additionally, the engines 22 and 24 may supply high pressure and/or high temperature air to various other components and systems of the aircraft 20, if desired. As illustrated, the engines 22 and 24 are coupled with the aircraft 20 on opposite sides of the fuselage 26. In other embodiments, other mounting positions may be used. The engines 22 and 24 provide force alongside the aircraft 20, which is transmitted to the aircraft 20, and specifically to its airframe 28, through a mount system 30 as illustrated in FIG. 2. The airframe 28 forms the mechanical structure of the aircraft 20 and may include the fuselage 26.

In the exemplary embodiment as illustrated in FIG. 2, the engines 22, 24 (in this case the engine 24), has the mount system 30, which includes a forward mount system 32 and an aft mount system 34, both of which are connected with the airframe 28 through and at structural members. In general, one or more coupling elements located on, or connected with, the engines 22, 24 (each as one body) are coupled with one or more coupling elements located on, or connected with, the airframe 28 (as another body). The forward mount system 32 is connected with the airframe 28, such as at a pylon beam 40, through a yoke 42. The aft mount system 34 is connected with the airframe 28 through a pylon beam 44, which is connected to the engine 24 through a linkage 46 that includes at least one link. The pylon beam 40 of the forward mount system 30 may be similar to the pylon beam 44 of the aft mount system 34 and both are designed with geometry that matches the application.

Similar pylon beams 40 and 44 may extend to each of the engines 22, 24 and may form a part of the airframe 28 of the aircraft 20. The parts of the pylon beams 40 and 44 that extend between the fuselage 26 and the engines 22, 24 may be covered by an aerodynamically shaped pylon (not shown), so that the engines 22 and 24 are supported at a position that is spaced away from the fuselage 26, in this embodiment in a cantilevered manner. The engine 24 includes the typical components that combust fuel and provide thrust. FIG. 2 omits various components from the view for simplicity, and to illustrate the general environment of the mount system 30 and its functions.

As shown in FIG. 2, the yoke 42 of the forward mount system 32 is connected with the engine 24 at a front frame 48, which may be configured as a ring shaped structural member of the engine 24. The connection with the engine 24 is a three-point coupling including an upper connector 36, a lower connector 38 and a link connector 37. The link connector 37 may be a secondary or redundant coupling. The aft mount system 34 is connected with the engine 24 at an outer bypass duct 50 through the linkage 46. The mount system 30 transfers loads between the engine 24 and the airframe 28. These loads include those that result from the weight, thrust, aerodynamics, temperature changes, operations, and torque.

Figure 3:
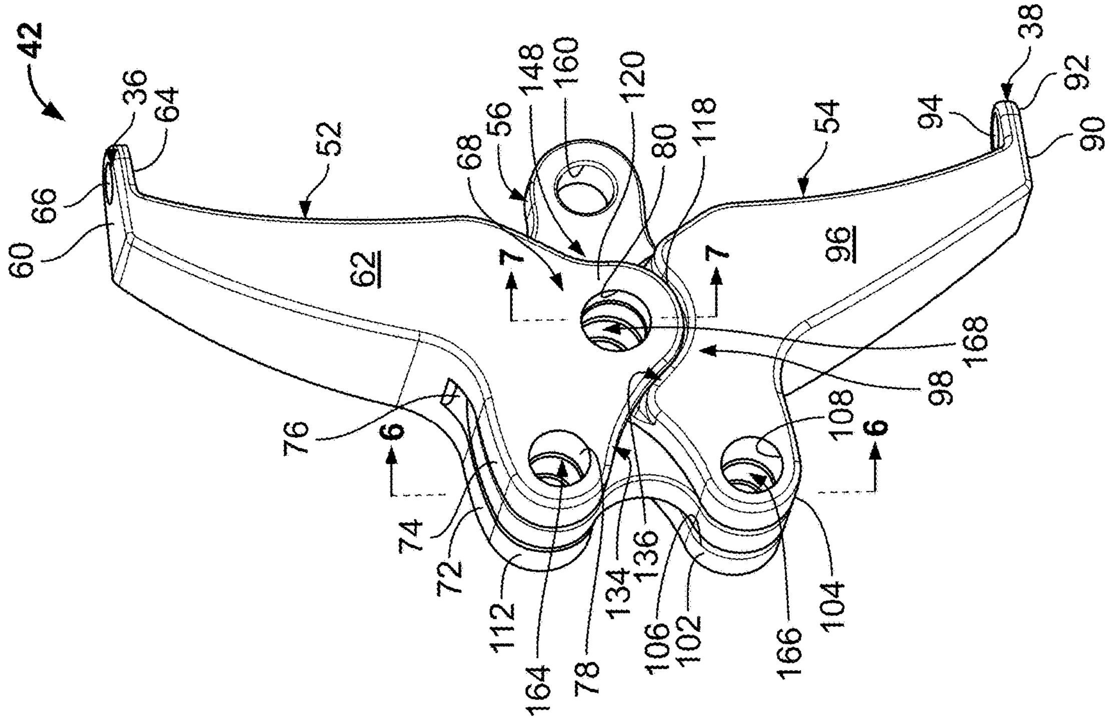
FIG. 3 is a perspective illustration of assembled parts of the yoke of the mount system of FIG. 2, in accordance with a number of embodiments.

Referring to FIG. 3, the yoke 42 is illustrated in isolation removed from the aircraft 20. As will be appreciated, the yoke 42 is amenable to mounting in a variety of applications. In the application of the aircraft 20, the yoke has a physical size, that in the vertical direction as viewed, is in the range of approximately one meter in length. The yoke 42 is assembled from a plural number of components, in this example, three components. The components of the yoke 42 include two limbs and a hub referred to herein as an upper limb 52, a lower limb 54 and a central hub 56, all of which may be made of metal or another material, including materials such as titanium and/or inconel. While the components extending from the central hub 56 are referred to herein as an "upper limb 52" and a "lower limb 54," their orientation need not be as such, and they may be oriented in any relationship such as horizontal relative to one another, or may be otherwise disposed.

The upper limb 52 includes a terminal end 60 with the upper connector 36 tailored to the application and in this case for connection to engine 24. In this example, the upper connector 36 includes a cantilevered projection 64 with an opening 66 for coupling with the engine 24. In other embodiments, the upper connector 36 may include a connecting rod, clamp, quick-connect, yoke, or another form of connecting element or elements. The upper limb 52 includes a body 62 that extends from the upper connector 36, increasing in cross sectional size, to a joint part, referred to as coupling section 68. The coupling section 68 connects with the central hub 56 and with the lower limb 54. The coupling section 68 includes a pair of arms 72 and 74 that are plates or that are plate-like in shape and that extend from the body 62. The arms 72 and 74 are spaced apart from one another forming a receiver 76 that is a type of slotted opening/cavity in the upper limb. The arm 74 includes openings 78 and 80. The arm 72 includes an opening 82 (FIG. 5) that is aligned with the opening 78 and an opening 84 (FIG. 5) that is aligned with the opening 80.

Figure 4:
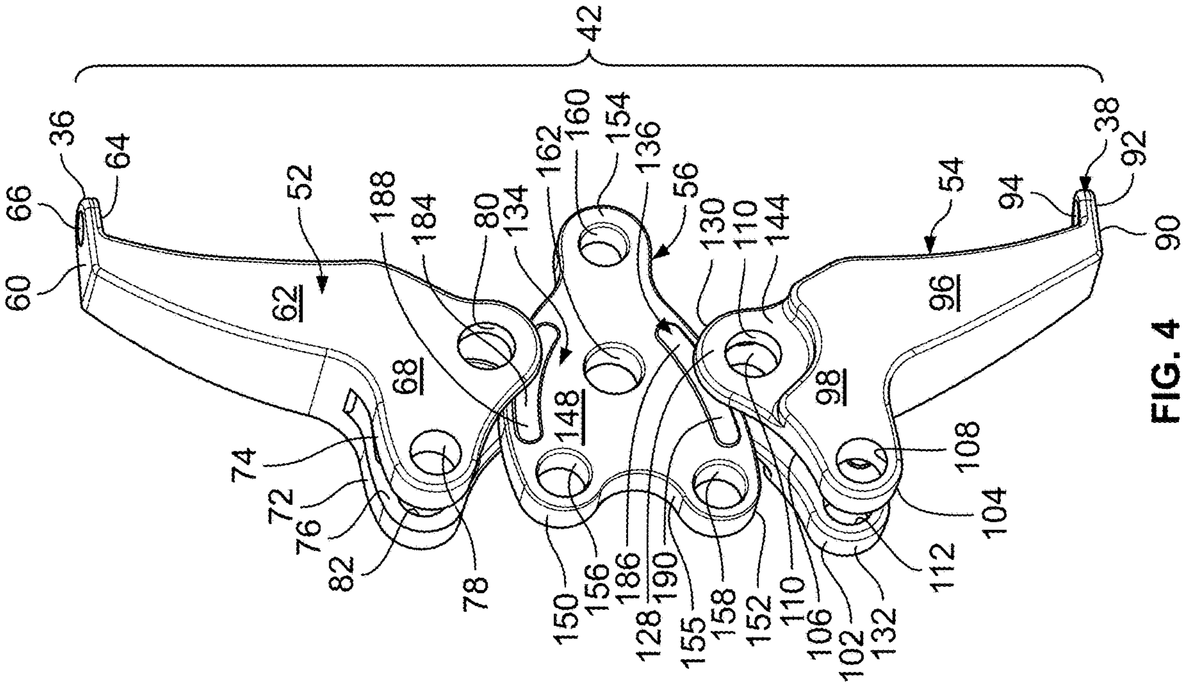
FIG. 4 is a perspective, exploded view of parts of the yoke of FIG. 3, in accordance with a number of embodiments.

Similarly, the lower limb 54 includes a terminal end 90 with the lower connector 38 tailored to the application and in this case for connection to engine 24. In this example, the lower connector 38 includes a cantilevered projection 92 with an opening 94 for coupling with the engine 24. In other embodiments, the lower connector 38 may include a connecting rod, clamp, quick-connect, yoke, or another form of connecting element. The lower limb 54 includes a body 96 that extends from the lower connector 38, increasing in cross sectional size, to a joint part, referred to as coupling section 98. The coupling section 98 connects with the central hub 56 and with the upper limb 52. The coupling section 98 includes a pair of arms 102 and 104 that are plates or that are plate-like in shape and that extend from the body 96. The arms 102 and 104 are spaced apart from one another forming a receiver 106 that is a type of slotted opening/cavity in the lower limb 54. The arm 104 includes openings 108 and 110 (FIG. 4). The arm 102 includes an opening 112 (FIG. 4 and FIG. 6) that is aligned with the opening 108 and an opening 114 (FIG. 7) that is aligned with the opening 110.

At its lower extremity 118, the coupling section 68 of the upper limb 52 includes an extension 120 in both arms 72, 74 that is semi-circular in shape and that contains the openings 80 and 84. The extension 120 is split with mirror image parts on each side of the receiver 76. The coupling section 68 also includes an extension 122 in both of the arms 72, 74 that is semi-circular in shape and is spaced from the extension 120. The extension 122 contains the openings 78 and 82. The extension 122 is split with mirror image parts on each side of the receiver 76.

At its upper extremity 128 (FIG. 4), the coupling section 98 of the lower limb 54 includes an extension 130 in both of the arms 102, 104 that is semi-circular in shape and that contains the openings 110 and 114. The coupling section 98 also includes an extension 132 in both arms 102, 104 that is semi-circular in shape and is spaced from the extension 130. The extension 132 contains the openings 108 and 112 (FIG. 4). The extensions 130 and 132 are each split with mirror image parts on each side of the receiver 106.

Figure 5:
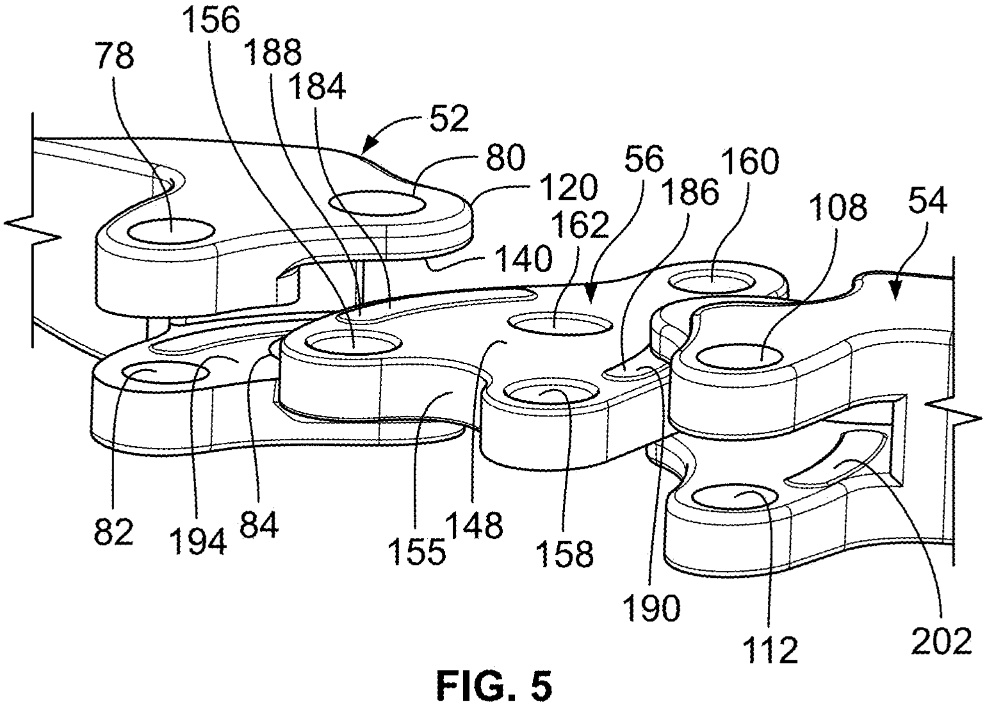
FIG. 5 is a fragmentary, perspective illustration of part of the exploded view of the yoke of FIG. 4, in accordance with a number of embodiments.
Figure 7:
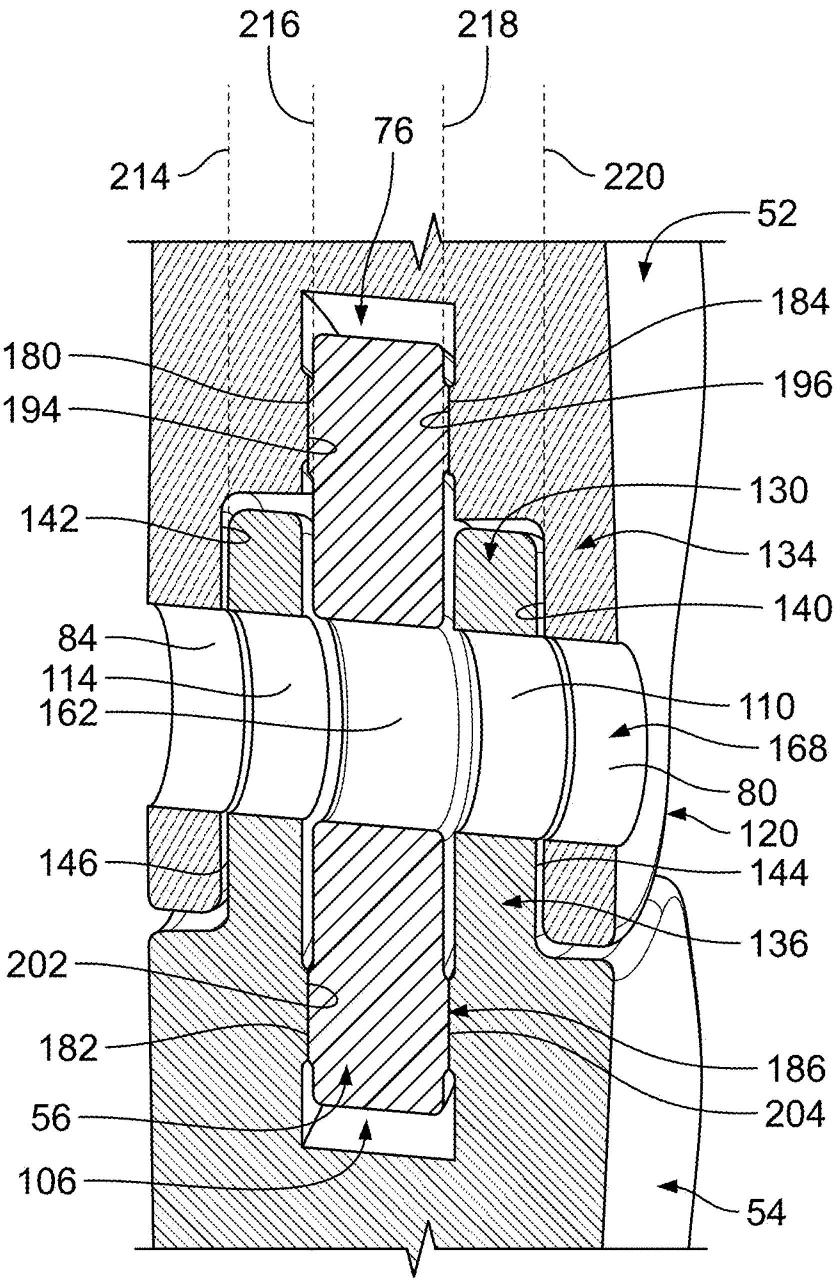
FIG. 7 is a perspective, fragmentary, cross sectional view taken generally through the line 7-7 of FIG. 3, in accordance with a number of embodiments.

Referring to FIGS. 4, 5 and 7 along with FIG. 3, the upper and lower limbs 52, 54 form lap joints 134 and 136 around the openings 78, 82, 108, 112, 80, 110, 114 and 84. One lap joint 134 is between the upper limb 52 and both the hub 56 and the lower limb 54, and the other lap joint 136 is between the lower limb 54 and both the hub 56 and the upper limb 52. As such, each lap joint 134, 136 is a type of combination lap joint, and may be considered more than two joints that are fixed at three locations. The lap joints 134 and 136 are a type of half lap joint where material is thinner at the overlapping parts of both the upper limb 52 and the lower limb 54 so that the resulting overlapping member thicknesses at the lap joints 134, 136 is the same thickness as their respective involved arms 72, 102 and 74, 104. The extension 120 includes a pair of depressions 140 and 142 (best seen in FIG. 7) on its lateral inside surfaces facing the receiver 76 and the extension 130 includes a pair of depressions 144 and 146 on its lateral outside surfaces facing away from the receiver 106. The depressions 140, 144 and 142, 146 allow the lap joints 134 and 136 members of the upper limb 52 and the lower limb 54 to overlap.

The central hub 56 includes a body 148 from which three extensions 150, 152 and 154 project outward forming plates or forming a plate-like structure with an irregular periphery 155 of the central hub 56. The extension 150 contains an opening 156, the extension 152 contains an opening 158 and the extension 154 contains an opening 160. Another opening 162 is formed through the body 148 approximately in the center of the 56.

Figure 6:
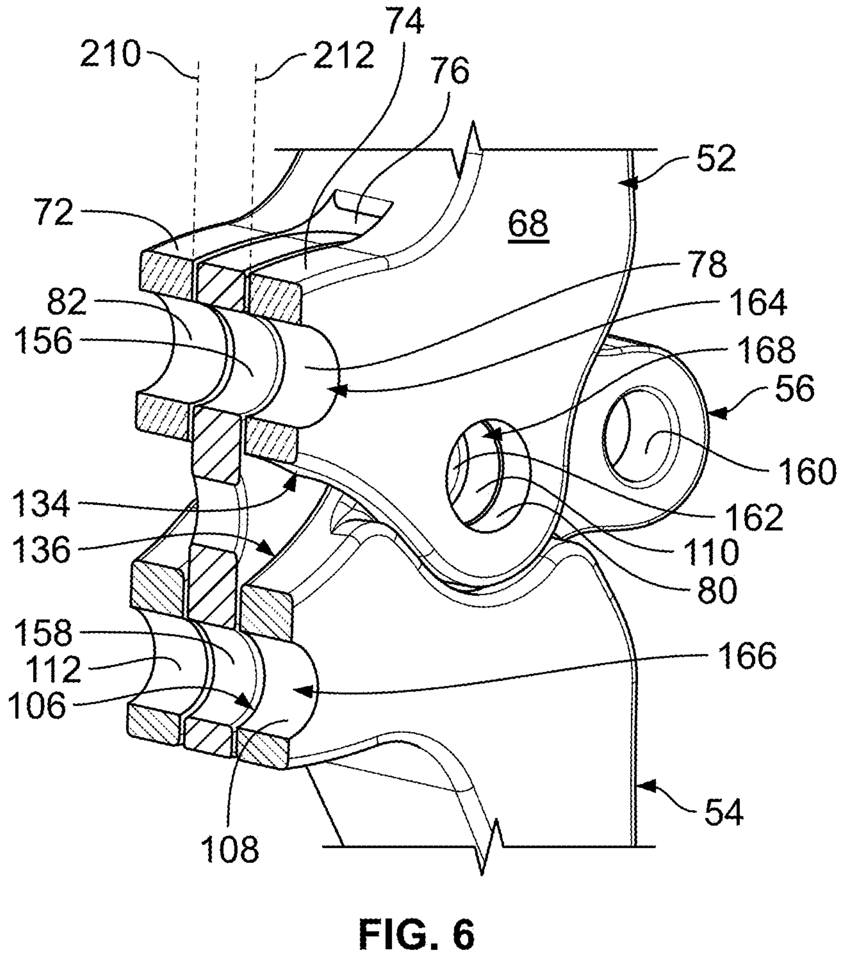
FIG. 6 is a perspective, fragmentary, cross sectional view taken generally through the line 6-6 of FIG. 3, in accordance with a number of embodiments.

The upper limb 52, the lower limb 54 and the central hub 56 are shown in their assembled positions in FIGS. 3, 6 and 7 showing the members of the lap joints 134 and 136 overlapping at their mating flanges. The central hub 56 is received within the receivers 76 and 106 presenting three apertures 164, 166 and 168 for securing the yoke 42 together. As best seen in FIG. 6, the aperture 164 is formed by aligning openings 78, 156 and 82. The aperture 166 is formed by aligning openings 108, 158 and 112. As best seen in FIG. 7, the aperture 168 is formed by aligning openings 80, 110, 162, 114 and 84.

Figure 8:
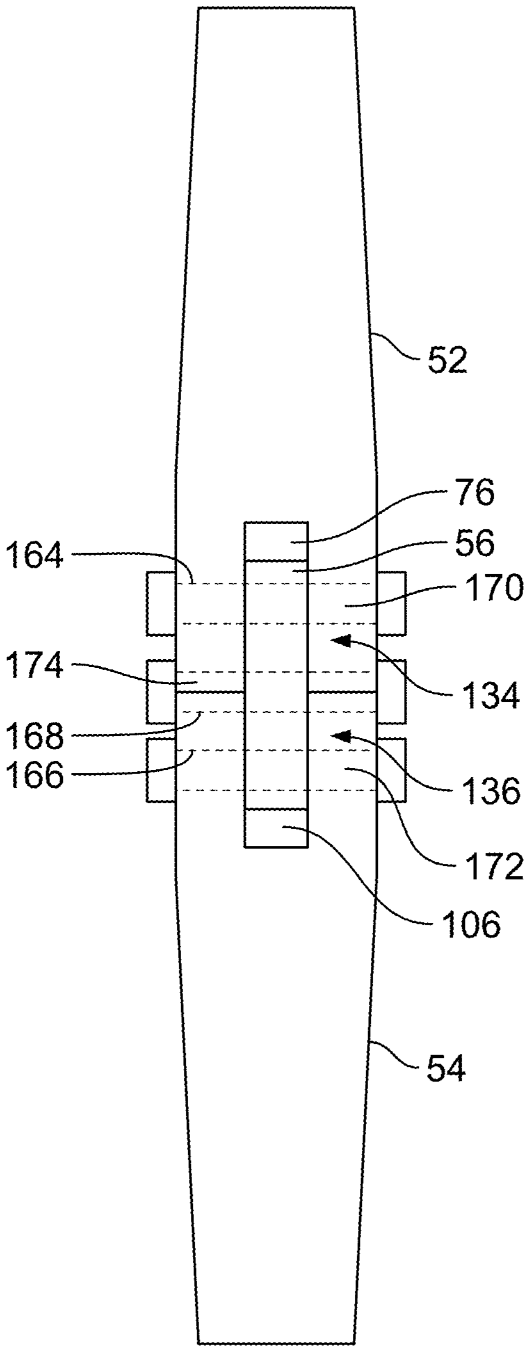
FIG. 8 is a side view illustration of the assembled yoke of the mount system of FIG. 2, in accordance with a number of embodiments.

As shown in FIG. 8 the aperture 164 receives a pin 170, the aperture 166 receives a pin 172 and the aperture 168 receives a pin 174. The pins 170, 172 and 174 may be bolts, pins with clips, or another form of fastener that extend through the apertures 164, 166 and 168 and that hold the upper limb 52, the lower limb 54 and the central hub 56 together in their assembled orientation. The elements captured by the pins 170, 172 and 174 are designed to slip together with tight tolerances and no gaps/space/play between their mating surfaces, which contact/touch each other. The lap joints 134 and 136 are each pinned at three places by the pins 170, 172 and 174. The arms 72 and 74 of the upper limb 52, the extensions 150, 152 and 154 of the central hub 56, and the arms 102 and 104 of the lower limb 54, operate as plates or plate sections that overlap with each other and that have a tight slip-fit or light press-fit in the lap joints 134, 136.

To facilitate a tight (contact) slip fit with no gaps or space or play between the upper limb 52, the lower limb 54 and the central hub 56, each of those three components includes a series of projecting embossed elements that are machined to provide the desired spaces for receiving or entering their mating elements at mating contact surfaces. The projecting elements are referred to as pads or contact pads because they project from their surrounding areas of the upper limb 52, the lower limb 54 and the central hub 56, and because they touch each other when assembled. All pads are visible in FIG. 7, while some of the pads and their configurations are shown in FIGS. 4 and 5. The pads are embossed structures that are a type of raised area as compared to their surroundings.

As seen in FIG. 7, the central hub 56 includes two pads 180 and 182 on one side and two pads 184 and 186 on its opposite side. The pads 184 and 186 are visible in FIGS. 4 and 5 where it can be seen that they each project from their surrounding areas. The pad 184 is located between the opening 162 and the periphery 155 of the central hub 56. The pad 186 is located between the opening 162 and the periphery 155 of the central hub 56 and on the opposite side of the opening 162 from the pad 184. Each of the pads 184 and 186 is shaped as a curved and elongated narrow platform with a flat contact surface 188, 190 to spread the contact area between the components. The pads 180 and 182 are behind the central hub 56 as viewed in FIG. 4 and are shaped the same as the pads 184 and 186 and located on the opposite side of the central hub 56.

The upper limb 52 includes pads 194 and 196, each projecting into the receiver 76. The pad 194 has a shape similar to, or the same as, that of the pad 180 and the pad 196 has a shape similar to, or the same as, that of the pad 184. The pad 194 contacts the pad 180 and the pad 196 contacts the pad 182. As a result, there can be no lateral movement of the upper limb 52 relative to the central hub 56. To achieve this result, all of the contact surfaces of the pads 180, 184, 194 and 196 are machined after printing of the parts and held to tight tolerances. Providing the pads 180, 184, 194 and 196 as raised projections reduces the machining time as compared to the time that would be required to machine the entire overlapping surfaces of the upper limb 52 in the receiver 76 and of and the central hub 56.

The lower limb 54 includes pads 202 and 204, each projecting into the receiver 106. The pad 202 has a shape similar to, or the same as, that of the pad 182 and the pad 204 has a shape similar to, or the same as, that of the pad 186. The pad 202 contacts the pad 182 and the pad 204 contacts the pad 186. As a result, there can be no lateral movement of the lower limb 54 relative to the central hub 56. To achieve this result, all of the contact surfaces of the pads 182, 186, 202, 204 (the embossed areas) are machined after printing of the parts and held to tight tolerances. The areas of the parts surrounding the embossed areas do not require machining. Providing the pads 182, 186, 202, 204 as raised projections reduces the machining time as compared to the time that would be required to machine the entire overlapping surfaces of the lower limb 54 and the central hub 56 in the receiver 106. This allows an extremely close fit between the parts of the yoke 42 once assembled, without having to hold tight tolerances on an entire overlapping surfaces of the mating parts.

The shear strength of the pins 170, 172 and 174 is the amount of force that they can withstand before shearing. As shown in FIG. 6 and with reference to FIG. 8, each of the apertures 164 and 166, along with their respective pins 170 and 172 are in double shear. There are two shear planes 210 and 212 passing through the aperture 164 and its pin 170. The shear planes 210 and 212 also pass through the aperture 166 and its pin 172. This places the pins 170 and 172 in double shear, meaning that the pins 170 and 172 can withstand twice the load without shearing as compared to a single shear joint.

As shown in FIG. 7 and with reference to FIG. 8, the aperture 168 and its pin 174 are in quadruple shear. There are four shear planes 214, 216, 218 and 220 passing through the aperture 168 and its pin 174. This places the pin 174 in quadruple shear, meaning that the pin 174 can withstand four-times the load without shearing as compared to a single shear joint.

Providing the connection between the upper limb 52, the lower limb 54 and the central hub 56 with no play and with multiple shear connections provides a high-strength structure. This is the case even though the yoke 42 is assembled from multiple, separately fabricated pieces. The lower overall size of the individual components, namely the upper limb 52, the lower limb 54 and the central hub 56, enables printing those parts where printing the entire yoke 42 may be impractical. Because the upper limb 52, the lower limb 54 and the central hub 56 are printed, they may be formed/fabricated with optimized strength and minimized weight. For example, their topology may be optimized by providing more mass where strength is needed and less mass in other areas. In embodiments, the areas of the upper limb 52, the lower limb 54 and the central hub 56 around the apertures 164, 166 and 168, around the pads 180, 184, 194, 196, 182, 186, 202 and 204, and around the connectors 36 and 38 may be provided with more mass of material, such as shown in FIG. 3. Other areas of the upper limb 52, the lower limb 54 and the central hub 56 may be formed with reduced material (not shown) as compared to that shown in FIG. 3, such as by being dished out, printed in a matrix or lattice structure, or otherwise.

Figure 9:
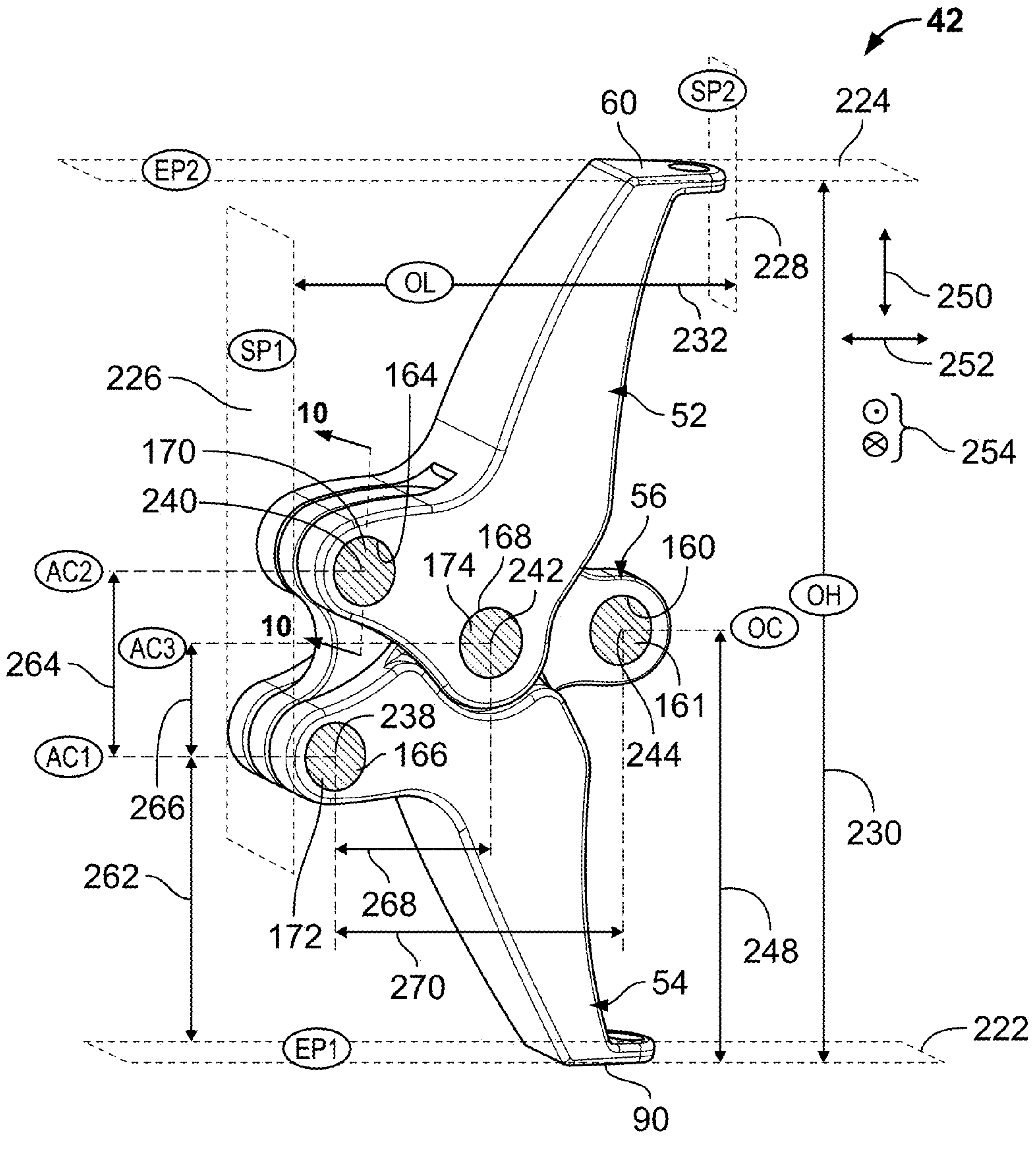
FIG. 9 is a perspective illustration of the assembled yoke of the mount system of FIG. 2 showing certain parameters, in accordance with a number of embodiments.
Figure 10:
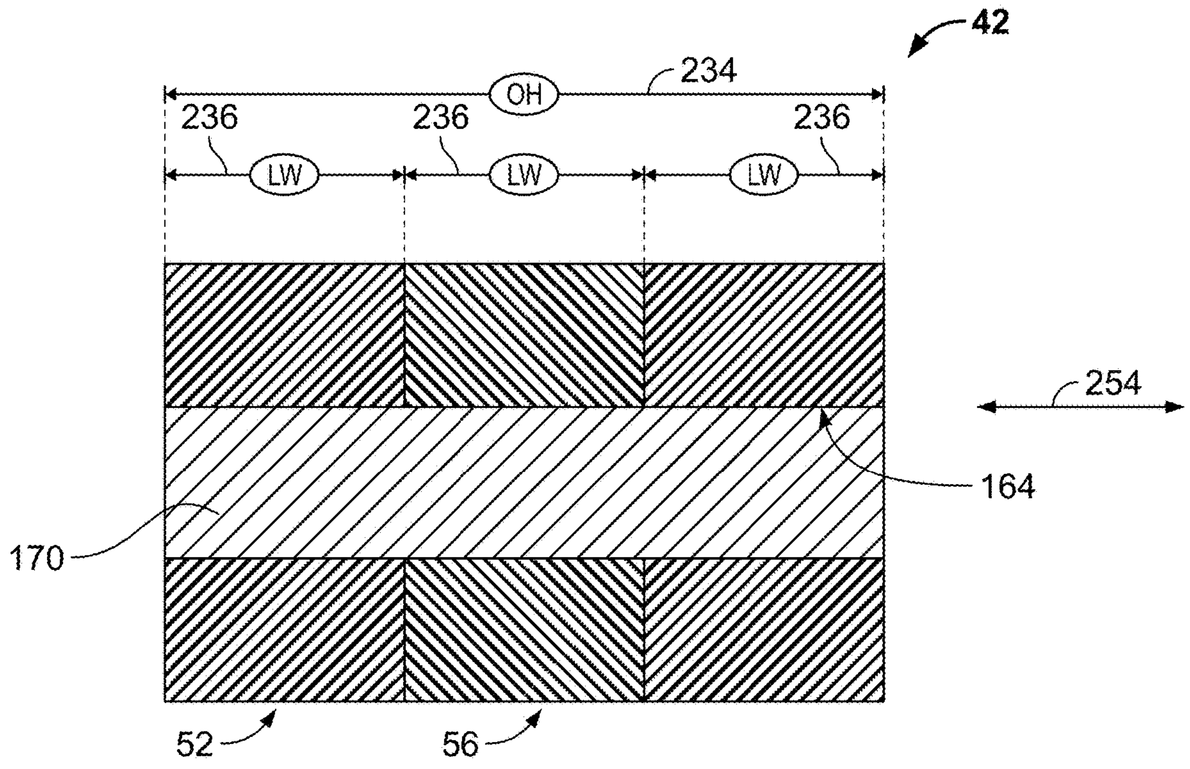
FIG. 10 is a sectional view taken generally through the line 10-10 of FIG. 9, in accordance with a number of embodiments.

Referring to FIGS. 9 and 10, the yoke 42 as assembled by its parts of the upper limb 52, the lower limb 54 and the central hub 56 exhibits a number of parameters and relationships between those parameters. The parameters include:

End Plane 1 (EP1) 222;
End Plane 2 (EP2) 224;
Side Plane 1 (SP1) 226;
Side Plane 2 (SP2) 228;
Overall Height (OH) 230;
Overall Length (OL) 232;
Overall Width (OW) 234;
Lug Width (LW) 236;
Aperture Center 1 (AC1) 238;
Aperture Center 2 (AC2) 240;
Aperture Center 3 (AC3) 242; and
Opening Center (OC) 244.

The assembled yoke 42 is extends/exists between EP1 222, EP2 224, SP1 226 and SP2 228. It will be appreciated that the planes are shown with edges but they extend infinitely. These four planes box in the yoke 42 in space on its length (direction 252) and height (direction 250) dimensions. The parameter OH 230 is the overall height of the yoke 42 between its end planes EP1 222 and EP2 232. The height is the largest overall dimension of the yoke 42 and isn't necessarily its vertical dimension but is the dimension in the direction 250, which is vertical in the view of FIG. 9. The parameter OL 232 is the overall length of the yoke 42 between SP1 and SP2 in the direction 252, which is horizontal in the view of FIG. 9 but is not necessarily horizontal when the yoke 42 is assembled in its application. The parameter 234 is the overall width of the yoke 42 at the apertures 164, 166 and 168 in the direction 254 and is shown at the aperture 164 in FIG. 10. The parameter LW 236 is the lug width of each of the parts in the direction 254, namely of the upper limb 52, the lower limb 54 and the central hub 56, at each of the apertures 164, 166 and 168 and is shown at the aperture 164 in FIG. 10. At the aperture 168, the lug width 236 includes components of both the upper limb 52 and the lower limb 54, as they overlap. The parameters AC1 238, AC2 240 and AC3 240 are the centers of the apertures 166, 164 and 168, respectively, and also the centers of the pins 172, 170 and 174, respectively. The parameter OC 244 is the center of the opening 160 and also of its pin 161.

In designing the components of the yoke 42 specific relationships between the aforementioned parameters apply. The distance 248 in the direction 250 (vertical) between EP1 and OC is equal to fifty percent of OH within twenty percent of the OH (EP1−OC(V)=OH×50%±20%). The distance 262 in the direction 250 (vertical) between EP1 and AC1 is equal to thirty percent of OH within fifteen percent of the OH (EP1−AC1(V)=OH×30%±15%). The distance 264 in the direction 250 (vertical) between AC1 and AC2 is equal to twenty percent of OH within ten percent of the OH (AC1−AC2(V)=OH×20%±10%). The distance 266 in the direction 250 (vertical) between AC1 and AC3 is equal to sixty percent of the distance 264 in the direction 250 (vertical) between AC1 and AC2 within twenty percent of the distance between AC1 and AC2(AC1−AC3(V)=AC1−AC2×60%±20%). The distance 270 between AC1 and OC in the direction 252 (horizontal) is equal to forty percent of OH within fifteen percent of the OH (AC1−OC(H)=OH×40%±15%). The distance 268 between AC1 and AC3 in the direction 252 (horizontal) is equal to fifty percent of the distance between AC1 and OC in the direction 252 (horizontal) within twenty percent of the distance between AC1 and OC (AC1−AC3(H)=AC1−OC(H)×50%±20%). The LW in the direction 254 is equal to thirty-three percent of OW within ten percent of the OW (LW=OW×33%±10%).

Presented in a listing, these relationships include:

a. EP1−OC(V)=OH×50%±20%;
b. EP1−AC1(V)=OH×30%±15%;
c. AC1−AC2(V)=OH×20%±10%;
d. AC1−AC3(V)=AC1−AC2×60%±20%;
e. AC1−OC(H)=OH×40%±15%;
f. AC1−AC3(H)=AC1−OC(H)×50%±20%; and
g. LW=OWx33%±10%.

The relationships a-g are beneficial to size and configure the upper limb 52, the lower limb 54 and the central hub 56 to facilitate additive manufacture and to distribute the loads on the yoke 42 during use in its application. Using the relationships and multiple shear planes also helps reduce the needed size and strength of the pins 170, 172 and 174. By applying the relationships a-g, the upper limb 52, the lower limb 54, the central hub 56 and the pins 170, 172 and 174 carry their loads is a manner that helps maintain the integrity of the assembled yoke 42 during operation.

Accordingly, a mount system is provided that enables the use of additive manufacturing for a component of substantial size, such as approximately a meter in its largest dimension, using three main parts that are printed individually and subsequently assembled. In other embodiments, and/or with larger or smaller components, a different number of individual parts may be printed and then assembled to form a component. The system allows relatively large structures to be printed on much smaller additive manufacturing printers. Topology optimization may be implemented to reduce excess weight, omitting material where not needed for strength. The individual pieces of the component may be manufactured at different locations, and/or by different machines, speeding up the overall fabrication process. Billet size and waste of machining associated with single monolithic piece construction may be avoided. Shipping cost may be reduced as parts can be shipped separately or disassembled allowing for a much smaller shipping container. Different materials may be used for different parts of the component. For example, different parts of a yoke may be made of inconel and titanium or combinations thereof. Parallel fabrication is enabled, where a single facility with multiple additive machines can print pieces simultaneously and can finish machine all pieces simultaneously.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A mount system for coupling an engine with a frame, the mount system comprising:

a yoke having two limbs each configured to couple with the engine and having a hub from which the two limbs extend, the yoke configured to couple with the frame, wherein the yoke is comprised of at least two pieces that join together around the hub, with plate sections of the at least two pieces having overlapping parts that define mating surfaces between the at least two pieces, wherein apertures are defined through the at least two pieces at the plate sections, wherein the apertures are configured to receive pins for securing the at least two pieces together, and wherein a plural number of shear planes are defined by the overlapping parts at each of the apertures and the pins, wherein the plate sections have pads extending from the mating surfaces, wherein the pads are configured to define a contact slip fit between the at least two pieces of the yoke.

2. The mount system of claim 1, wherein the two limbs are coupled with the engine and the yoke includes arms coupled with the frame, wherein the frame comprises an airframe.

3. The mount system of claim 1, wherein:

the at least two pieces comprise three pieces that include the two limbs and the hub, the two limbs comprise a first limb and a second limb, the overlapping parts of each of the first limb, of the second limb, and of the hub includes the pads that extend outward, providing contact at the pads between the first limb, the second limb and the hub.

4. The mount system of claim 1, wherein:

the at least two pieces comprise three pieces that include the two limbs and the hub, the yoke includes at least two lap joints to secure the two limbs and the hub together as one component, the at least two lap joints are fixed by three pins extending through the yoke, and all of the three pins are placed in multiple shear conditions at the at least two lap joints.

5. The mount system of claim 1, wherein:

the at least two pieces comprise three pieces that include the two limbs and the hub, the yoke includes two lap joints to secure the two limbs and the hub together as one component, the two lap joints are fixed by three pins extending through the yoke, and two of the three pins are placed in double shear and another of the three pins is placed in quadruple shear at the two lap joints.

6. The mount system of claim 1, wherein:

the at least two pieces comprise three pieces that include the two limbs and the hub, the yoke includes two lap joints to secure the two limbs and the hub together as one component, the two lap joints are fixed by three pins extending through the yoke, and all of the three pins extend through each of the two limbs and through the hub.

7. The mount system of claim 1, wherein:

the at least two pieces comprise three pieces that include the two limbs and the hub, the two limbs comprise a first limb and a second limb, the first limb has a first terminal end and the second limb has a second terminal end, the yoke has an overall height between the first terminal end and the second terminal end, a first pin extends through the yoke approximately at a center of the hub and is located a first distance from the first terminal end, a second pin extends through the yoke in a first extension of the hub and is located a second distance from the first terminal end, wherein the second distance is less than the first distance, a third pin extends through the yoke in a second extension of the hub and is located a third distance from the first terminal end, wherein the third distance is greater than the first distance, wherein the second distance is equal to thirty percent of the overall height, within fifteen percent of the overall height.

8. The mount system of claim 1, wherein the hub defines four openings, with the two limbs coupled with the hub at three of the four openings and the hub coupled with the engine at a fourth of the four openings.

9. The mount system of claim 1, wherein the two limbs comprise a first limb and a second limb, wherein each of the first limb and the second limb have extensions with depressions at which the first limb and the second limb mate and overlap.

10. The mount system of claim 1, wherein the two limbs each define a receiver opening in which the hub is disposed.

11. A mount system for coupling an engine with a frame, the mount system comprising:

a yoke having a first limb and a second limb, the first limb and the second limb configured to couple with the engine and having a hub from which the first and second limbs extend, the yoke configured to couple with the frame, wherein the yoke is comprised of separate pieces that include the first limb, the second limb, and the hub, wherein the first limb and the second limb join together around and with the hub, with plate sections of the first limb, the second limb, and the hub having overlapping parts that define mating surfaces between the first limb, the second limb, and the hub, wherein apertures are defined through the plate sections of each of the first limb, the second limb, and the hub, wherein the apertures are configured to receive pins for securing the first limb, the second limb, and the hub together, and wherein a plural number of shear planes are defined by the overlapping parts at each of the apertures and the pins.

12. The mount system of claim 11, wherein the plate sections have pads extending from the mating surfaces, wherein the pads are configured to define a contact slip fit between the first limb and the hub, and between the second limb and the hub, meaning the first limb, the second limb, and the hub slip together with contact at the mating surfaces between each of the first limb, the second limb, and the hub.

13. The mount system of claim 11, wherein the overlapping parts of each of the first limb, of the second limb, and of the hub include pads that extend outward, providing contact at the pads between the first limb and the hub, and between the second limb and the hub.

14. The mount system of claim 11, wherein:

the yoke includes at least two lap joints to secure the first limb, the second limb and the hub together as one component, the at least two lap joints are fixed by three pins extending through the yoke, and all of the three pins are placed in multiple shear conditions by the at least two lap joints.

15. The mount system of claim 11, wherein:

the yoke includes two lap joints to secure the first limb, the second limb and the hub together as one component, the two lap joints are fixed by three pins extending through the yoke, and two of the three pins are placed in double shear and one of the three pins is placed in quadruple shear by the two lap joints.

16. The mount system of claim 11, wherein:

the yoke includes two lap joints to secure the first limb, the second limb and the hub together as one component, the two lap joints are fixed by three pins extending through the yoke, and all of the three pins extend through each of the two limbs and through the hub.

17. The mount system of claim 11, wherein:

the first limb has a first terminal end and the second limb has a second terminal end, the yoke has an overall height between the first terminal end and the second terminal end, a first pin extends through the yoke approximately at a center of the hub and is located a first distance from the first terminal end, a second pin extends through the yoke at a first extension of the hub and is located a second distance from the first terminal end, wherein the second distance is less than the first distance, a third pin extends through the yoke at a second extension of the hub and is located a third distance from the first terminal end, wherein the third distance is greater than the first distance, wherein the second distance is equal to thirty percent of the overall height, within fifteen percent of the overall height.

18. The mount system of claim 11, wherein the hub defines four openings, with the first limb, the second limb and the hub couple together at three of the four openings, and with the hub coupled with the engine at a fourth of the four openings.

19. The mount system of claim 11, wherein each of the first limb and the second limb has extensions with depressions at which the first limb and the second limb mate and overlap, wherein the first limb and the second limb each define a receiver opening at the extensions in which the hub is disposed.

20. A mount system for coupling an engine with an airframe, the mount system comprising:

a yoke having a first limb, a second limb and a hub from which the first and second limbs extend, the first limb, the second limb and the hub each configured to couple with both the engine and with the airframe, wherein the yoke is assembled from separate pieces that include the first limb, the second limb, and the hub, wherein the first limb and the second limb join together around and with the hub, with plate sections of the first limb, the second limb, and the hub having overlapping parts that define mating surfaces between the first limb, the second limb, and the hub, wherein the plate sections have pads extending from the mating surfaces, wherein the pads are configured to define a contact slip fit between the first limb and the hub, and between the second limb and the hub wherein apertures are defined through the plate sections of each of the first limb, the second limb, and the hub, wherein the apertures are configured to receive pins for securing the first limb, the second limb, and the hub together, and wherein a plural number of shear planes are defined by the overlapping parts at each of the apertures and the pins.

* * * * *